United States Patent
Schlesener

(10) Patent No.: US 8,014,298 B1
(45) Date of Patent: Sep. 6, 2011

(54) DELAYED SERVICE RESTORATION

(75) Inventor: Matthew C. Schlesener, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1208 days.

(21) Appl. No.: 11/417,376

(22) Filed: May 4, 2006

(51) Int. Cl.
*G01R 31/08* (2006.01)

(52) U.S. Cl. ............... 370/242; 370/229; 370/445

(58) Field of Classification Search ........... 370/229, 370/392, 395.2, 401; 455/422.1, 8, 10; 379/58–60, 379/273, 279
See application file for complete search history.

(56) References Cited

U.S. PATENT DOCUMENTS

| | | | |
|---|---|---|---|
| 5,187,808 A * | 2/1993 | Thompson | 455/518 |
| 6,031,906 A * | 2/2000 | Rao | 379/273 |
| 2005/0122902 A1* | 6/2005 | Guo et al. | 370/229 |
| 2005/0251846 A1* | 11/2005 | Dravida et al. | 725/129 |
| 2006/0215570 A1* | 9/2006 | Zhang et al. | 370/242 |
| 2006/0294241 A1* | 12/2006 | Cherian et al. | 709/227 |
| 2007/0155376 A1* | 7/2007 | Payyappilly et al. | 455/422.1 |
| 2007/0201472 A1* | 8/2007 | Bhatia et al. | 370/392 |

* cited by examiner

*Primary Examiner* — Ricky Ngo
*Assistant Examiner* — David Oveissi

(57) ABSTRACT

A communication network comprises a service network configured to provide a service over access provided by an access network, and a first access system configured to access the service over the access provided by the access network, detect a loss of the access, monitor for access restoration, upon detecting the access restoration delay a first service restoration for a first delay period, and initiate the first service restoration after the first delay period.

20 Claims, 9 Drawing Sheets

DELAYED SERVICE RESTORATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The field of the invention relates to telecommunications, an in particular, to mitigating the consequences to a service network of the failure of an access network.

2. Description of the Prior Art

Recently, service providers have begun to partner with cable multi-system operators (MSO) to provide customer access for services. Examples of services include video on demand and voice over Internet protocol (VoIP) service, as well as other services. Other times, a service provider provides its own access. In either case, access is typically considered a general service over which other services, such as VoIP, are provided.

Occasionally, customers lose access in the event of an access failure. For instance, equipment in the access network could fail. Other causes of access loss are possible. In the even of an access failure, most customer equipment monitors for access restoration and then initiates a restoration process. Unfortunately, if the access failure is a mass event, then a large number of customers will initiate their restoration processes simultaneously. Such a mass restoration event could possibly overload elements in the service network.

FIG. 1 illustrates a communication network in an example of the prior art. Communication network 100 includes service network 110 coupled to access networks 120, 130, 150 and 150 by session border controllers (SBC) 112, 113, 114, and 115 respectively. Session border controllers are well known network elements that manage traffic flow across network borders. Access network 120 includes devices 121, 123, and 122. Access network 130 includes devices 131, 133, and 132. Access network 140 includes devices 141, 143, and 142. Lastly, access network 150 includes devices 151, 153, and 152.

FIG. 2 illustrates an operational situation in the prior art. To begin, device 121 has a session connection over access network 120 to SBC 112, and in turn, to service network 110. Likewise, device 122 has a session established with service network 110 via SBC 112 and access network 120. Device 123 has also established a session with service network 110 over SBC 112 and access network 120.

As illustrated, an access cessation event causes the loss of the service sessions established by devices 121, 122, and 123. Namely, due to the loss of access, devices 121, 122, and 123 are no longer able to continue their sessions.

Eventually, access is restored and an access restoration signal is applied to devices 121, 122, and 123. In response to detecting the access restoration signal, devices 121, 122, and 123 all simultaneously initiate service restore requests to SBC 112. The service restore requests, on a larger scale, could crash SBC 112.

SUMMARY OF THE INVENTION

An embodiment of the invention helps solve the above problems and other problems staggering the initiation of a restoration process across multiple systems. In an embodiment, a communication network comprises a service network configured to provide a service over access provided by an access network, and a first access system configured to access the service over the access provided by the access network, detect a loss of the access, monitor for access restoration, upon detecting the access restoration delay a first service restoration for a first delay period, and initiate the first service restoration after the first delay period.

In an embodiment, the communication network further comprises a second access system configured to access the service over the access provided by the access network, detect the loss of the access, monitor for the access restoration, upon detecting the access restoration delay a second service restoration for a second delay period, and initiate the second service restoration after the second delay period.

In an embodiment, the first delay period is different than the second delay period.

In an embodiment, the access network comprises a cable network.

In an embodiment, the access system comprises a cable modem.

In an embodiment, the access system comprises a phone coupled to the cable modem.

In an embodiment, the service comprises Voice over Internet protocol (VoIP) service.

In an embodiment, the service network comprises a Voice over Internet protocol (VoIP) service network.

In an embodiment, a method of operating a communication network comprises, in a service network, providing a service over access provided by an access network, and in a first access system, accessing the service over the access provided by the access network network, detecting a loss of the access, monitoring for access restoration, upon detecting the access restoration delaying a first service restoration for a first delay period, and initiating the first service restoration after the first delay period.

In an embodiment, an access system comprises an interface configured to access a service provided by a service network over access provided an access network, and a processing system configured to detect a loss of the access, monitor for access restoration, upon detecting the access restoration delay a service restoration for a delay period, and initiate the service restoration after the delay period.

BRIEF DESCRIPTION OF THE DRAWINGS

The same reference number represents the same element on all drawings.

DETAILED DESCRIPTION OF THE PREFERRED EMBODIMENT

FIGS. 3-9 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
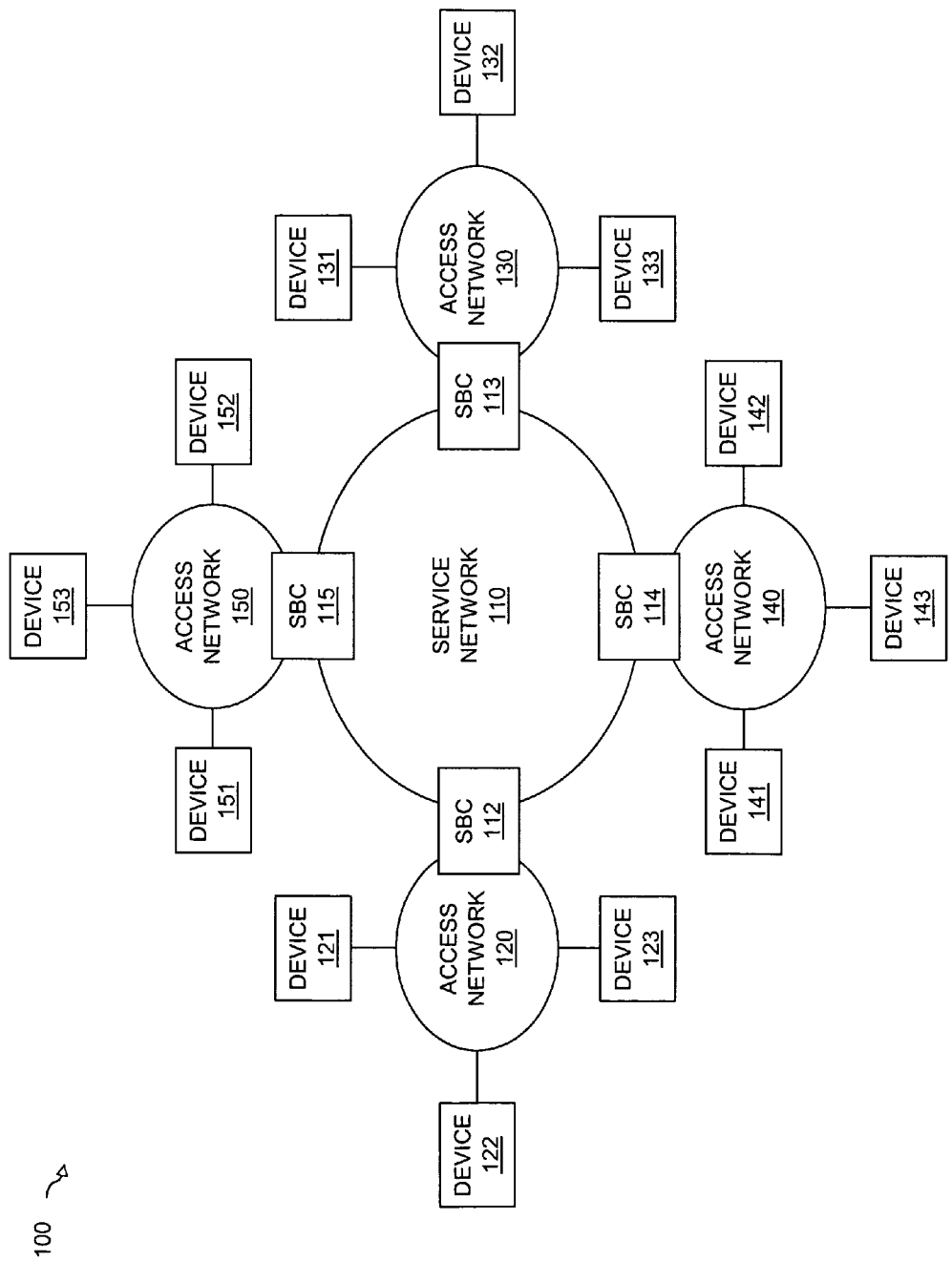
FIG. 1 illustrates a communication network in an example of the prior art.
Figure 2:
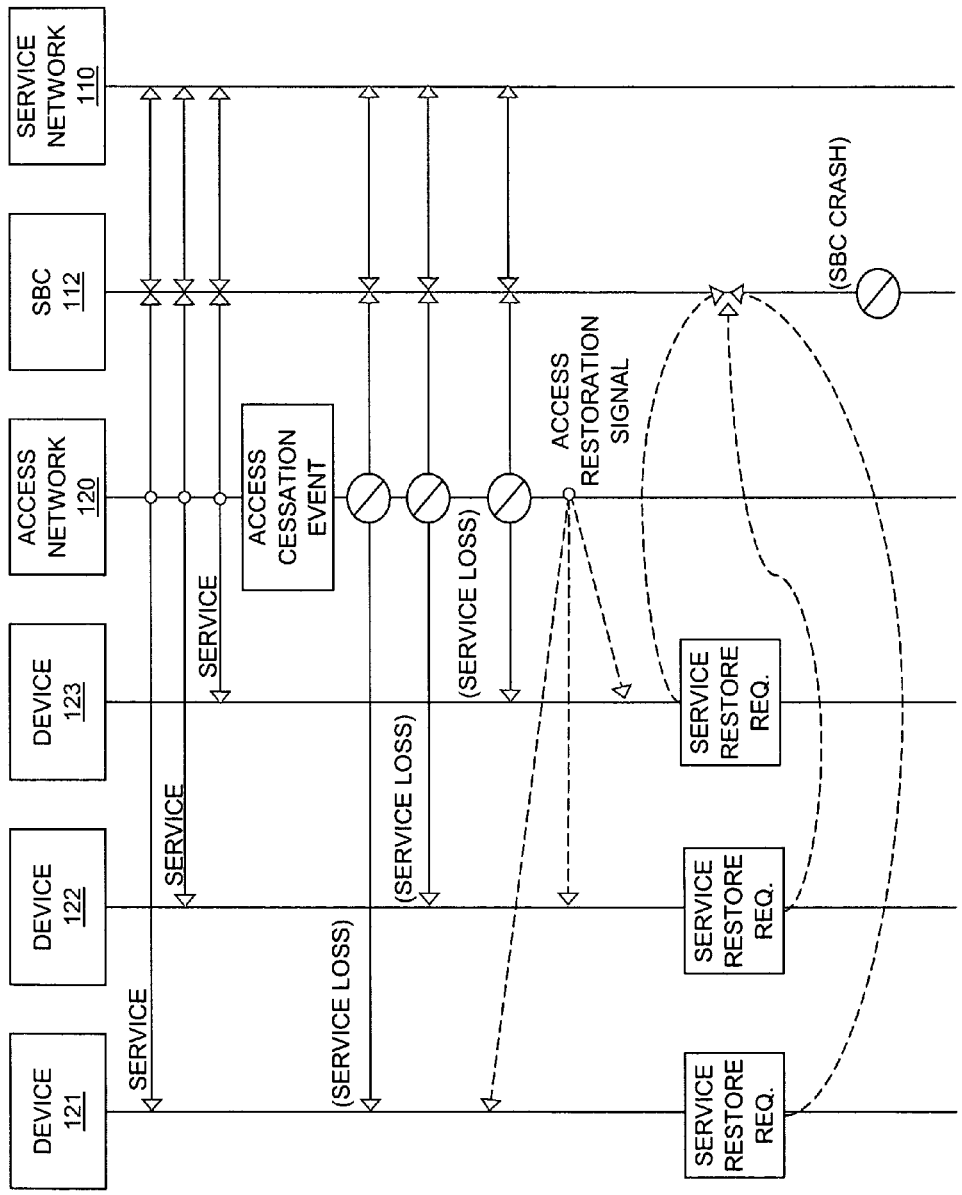
FIG. 2 illustrates a flow diagram in an example of the prior art.
Figure 3:
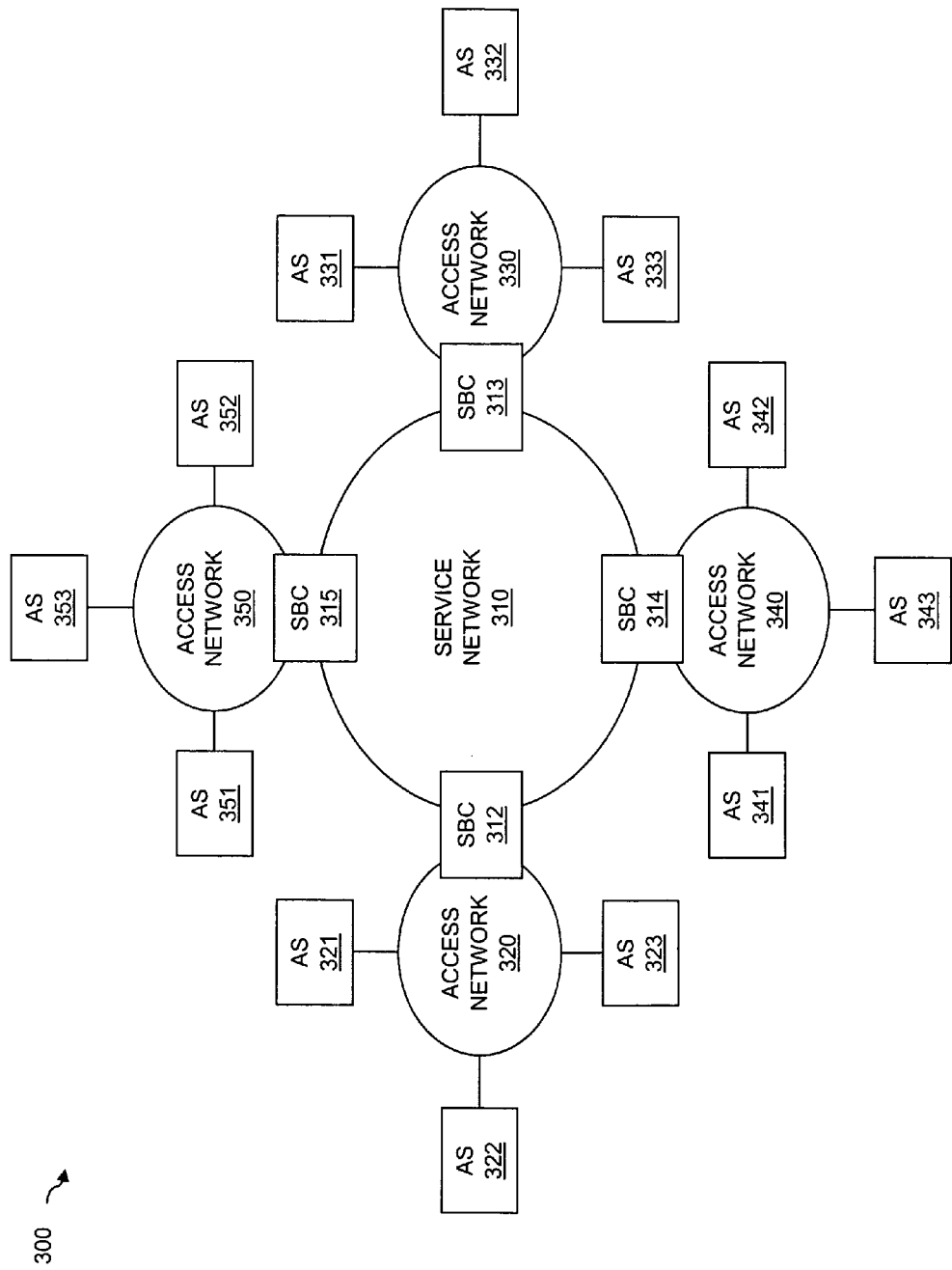
FIG. 3 illustrates a communication network in an embodiment of the invention.

FIG. 3 illustrates a communication network in an embodiment of the invention. Communication network 300 includes service network 310 coupled to access networks 320, 330, 350 and 350 by session border controllers (SBC) 312, 313, 314, and 315 respectively. Session border controllers are well known network elements that manage session traffic flow across network borders. Access network 320 includes access systems 321, 323, and 322. Access network 330 includes access systems 331, 333, and 332. Access network 340 includes access systems 341, 343, and 342. Access network 350 also includes access systems 351, 353, and 352.

Figure 4:
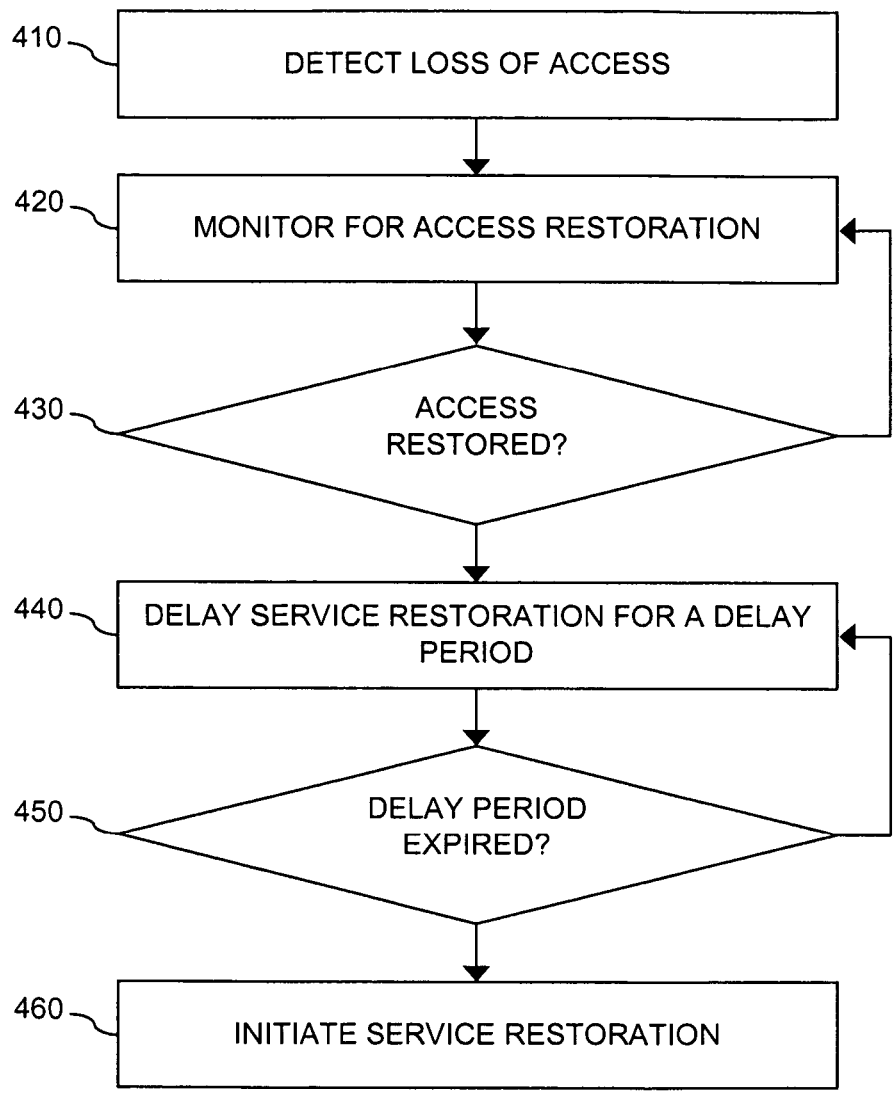
FIG. 4 illustrates the operation of an access system in an embodiment of the invention.

FIG. 4 illustrates the operation of an access system in an embodiment of the invention. To begin, the access system detects a loss of access that occurs in the access network over which the access system is provided access to a service provided by a service provider (Step 410). Next, the access system monitors for access restoration (Step 420). The access system could detect the access restoration by sensing a signal applied to an access line, receiving a control message, polling, or the like.

The access system determines based on the monitoring whether or not access has been restored (Step 430). If access has been restored, the access system delays a service restoration process for a particular delay period (Step 440). The period could be a randomly generated number. Optionally, the period could be programmed at the time of manufacturing or service configuration. Other sources of the delay period are possible. Upon expiration of the delay period (Step 450), the access system initiates the restoration process (Step 460).

Figure 5:
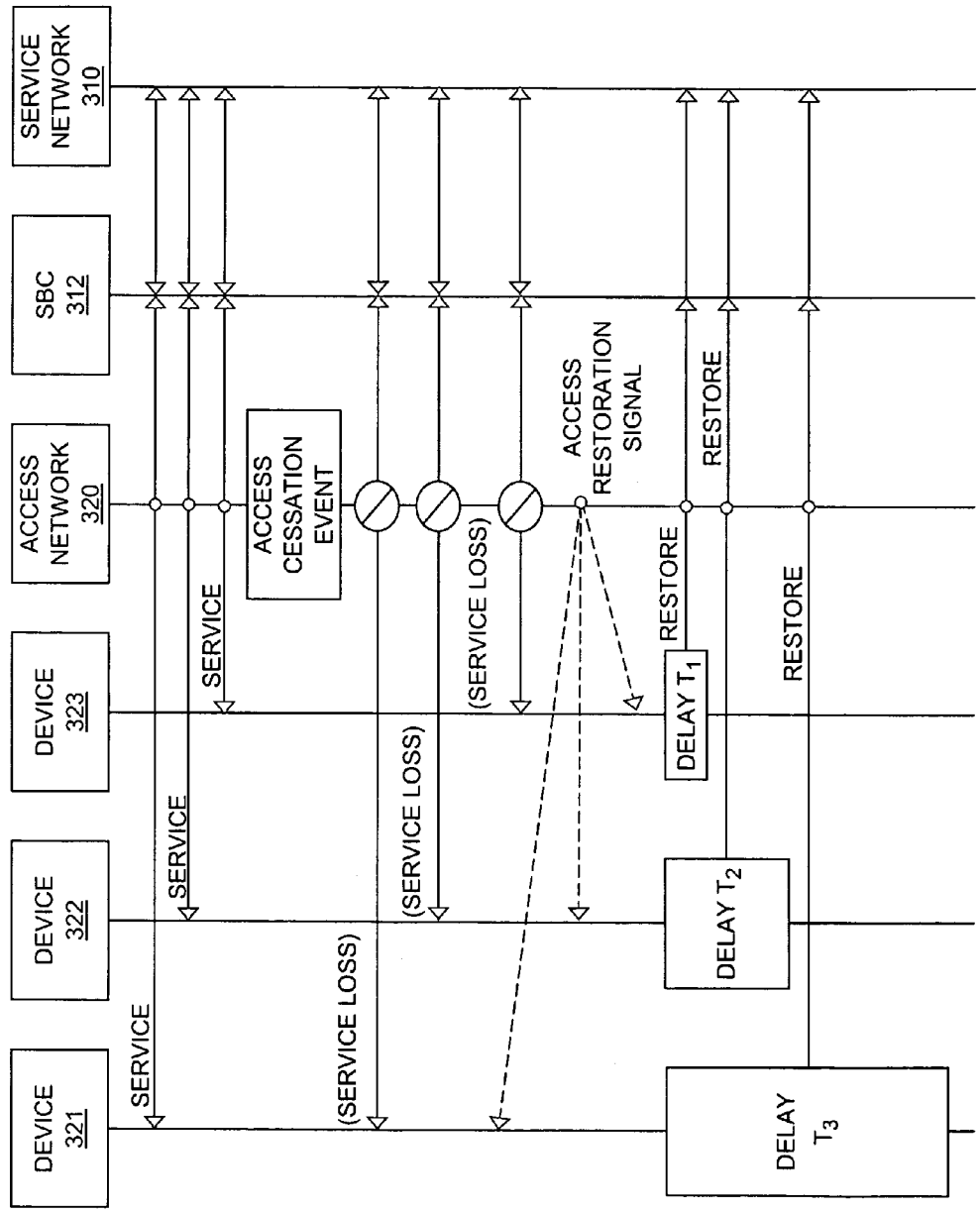
FIG. 5 illustrates a flow diagram in an embodiment of the invention.

FIG. 5 illustrates a system flow diagram in an embodiment of the invention. To begin, access system 321 has a session connection over access network 320 to SBC 312, and in turn, to service network 310. Likewise, access system 322 has a session established with service network 310 via SBC 312 and access network 320. Access system 323 has also established a session with service network 310 over SBC 312 and access network 320.

As illustrated, an access cessation event causes the loss of the service sessions established by access systems 321, 322, and 323. Namely, due to the loss of access, access systems 321, 322, and 323 are no longer able to continue their sessions.

Eventually, access is restored and an access restoration signal is applied to access systems 321, 322, and 323. In response to detecting the access restoration signal, access systems 321, 322, and 323 operate as described for FIG. 4. In particular, the access systems detect the access restoration. Each individual access system determines a unique delay period. Each access system then holds off on initiating their respective restoration processes until the expiration of their respective delay periods.

As each delay period expires, the associated access system initiates its restoration process with SBC 312. In this manner, the restoration processes initiated by each access system are staggered. As a result, the service restoration attempts reduce the likelihood of crashing SBC 312.

Figure 6:
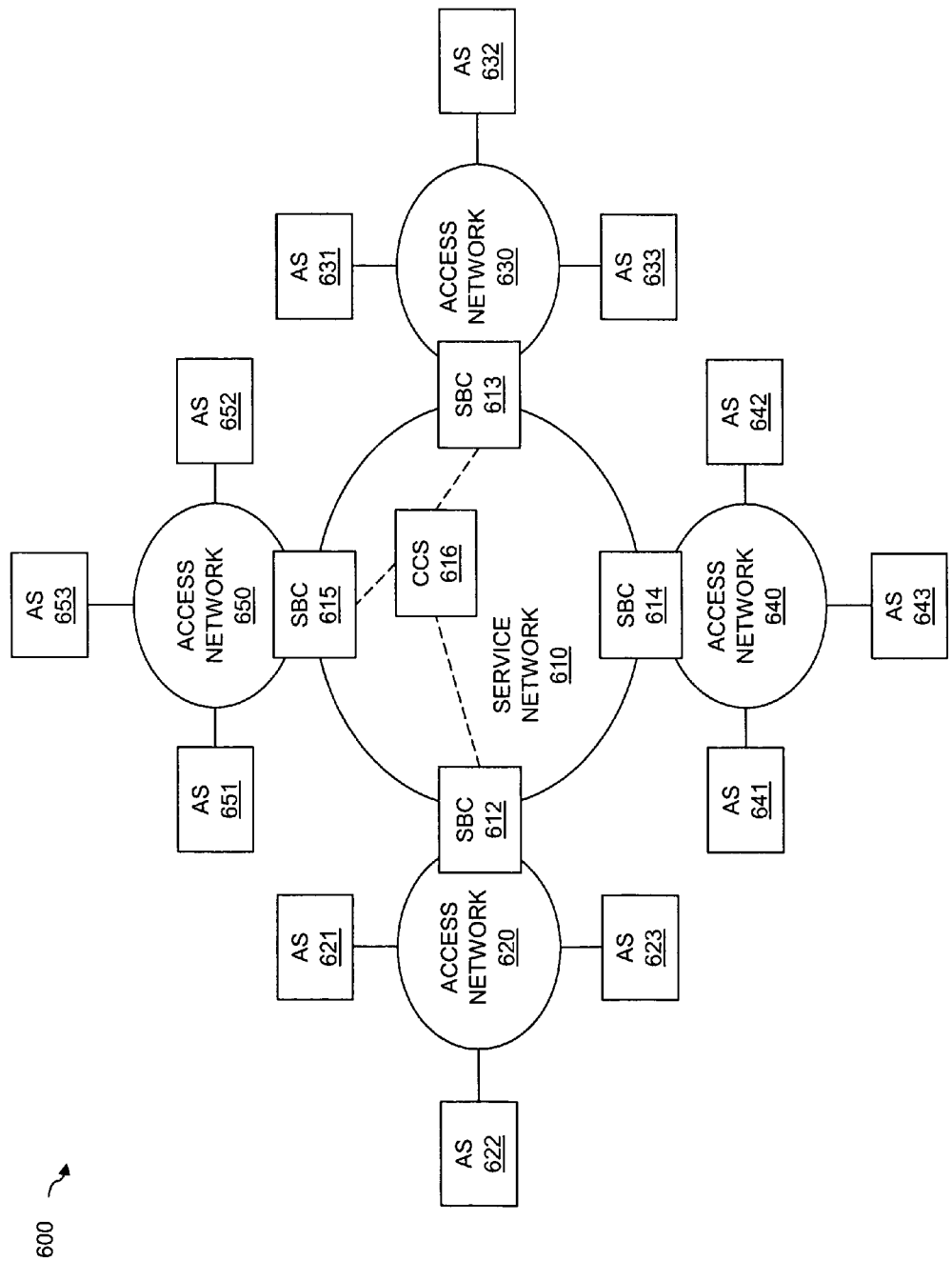
FIG. 6 illustrates a communication network in an embodiment of the invention.

FIG. 6 illustrates a communication network 600 in an embodiment of the invention. Communication network 600 includes service network 610 coupled to access networks 620, 630, 650 and 650 by session border controllers (SBC) 612, 613, 614, and 615 respectively. Session border controllers are well known network elements that manage session traffic flow across network borders. Access network 620 includes access systems 621, 623, and 622. Access network 630 includes access systems 631, 633, and 632. Access network 640 includes access systems 641, 643, and 642. Access network 650 also includes access systems 651, 653, and 652. Service network 610 also includes call control system 616. Call control system 616 is a well known element that provides session control over calls placed to and from service network 610. It should be understood that communication network 600 could comprise a session initiation protocol (SIP) enabled service network.

Figure 7:
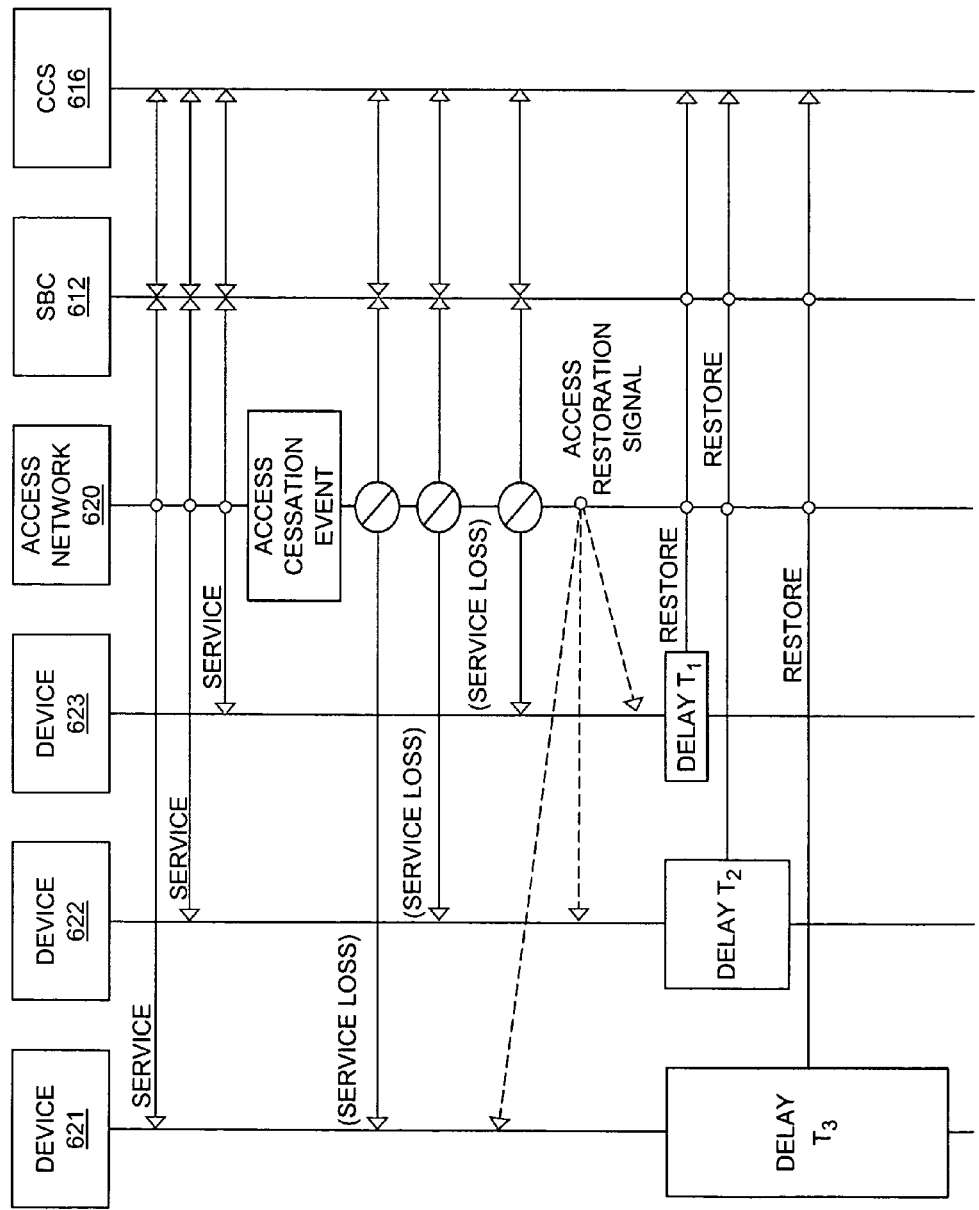
FIG. 7 illustrates a flow diagram in an embodiment of the invention.

FIG. 7 illustrates a system flow diagram in an embodiment of the invention. To begin, access system 621 has a session connection over access network 620 to SBC 612, and in turn, to service network 610. Likewise, access system 622 has a session established with service network 610 via SBC 612 and access network 620. Access system 623 has also established a session with service network 610 over SBC 612 and access network 620.

As illustrated, an access cessation event causes the loss of the service sessions established by access systems 621, 622, and 623. Namely, due to the loss of access, access systems 621, 622, and 623 are no longer able to continue their sessions.

Eventually, access is restored and an access restoration signal is applied to access systems 621, 622, and 623. In response to detecting the access restoration signal, access systems 621, 622, and 623 operate as described for FIG. 4. In particular, the access systems detect the access restoration. Each individual access system determines a unique delay period. Each access system then holds off on initiating their respective restoration processes until the expiration of their respective delay periods.

As each delay period expires, the associated access system initiates its restoration process with CCS 616. In an example, the associated access system transmits a SIP signaling message to restore access. In this manner, the restoration processes initiated by each access system are staggered. As a result, the service restoration attempts reduce the likelihood of crashing CCS 616.

Figure 8:
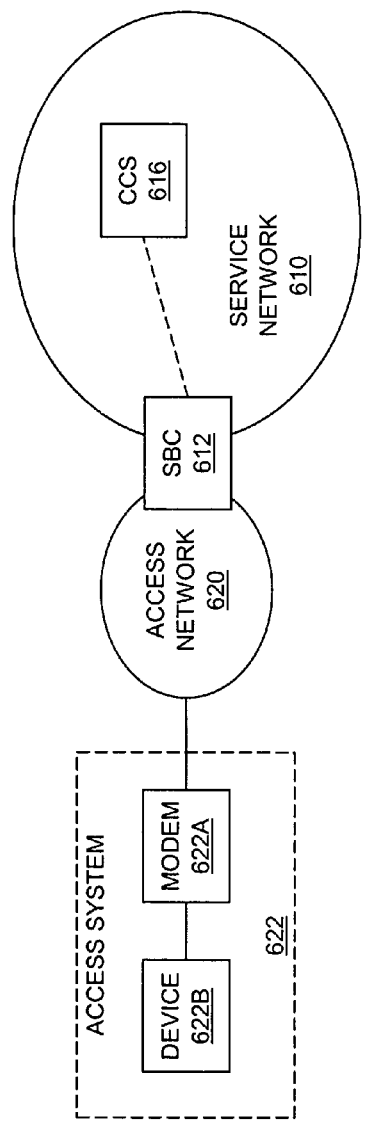
FIG. 8 illustrates a portion of a communication network in an embodiment of the invention.

FIG. 8 illustrates a portion 601 of communication network 600, including service network 610, access network 620, and access system 622. Service network 610 includes SBC 612 and CCS 616. Access system 622 includes modem 622A and phone 622B. Modem 622 could be any type of device capable of interfacing communications between phone 622A and access network 620. Phone 622B could be any type of communication device capable of providing phone functions and interfacing communications between modem 622A and a user. Phone 622A could be in communication with modem 622 over a wireline or wireless connection. Likewise, modem 622 could be in communication with access network 620 over a wireless or wireline connection, or a combination thereof.

In operation, modem 622A and phone 622B could function together to operate as described for access systems in FIGS. 3 and 6. In an embodiment, the entire functionality of an access system as described in FIGS. 3 and 6 could be included in modem 622A. In another embodiment, portions of the functionality of an access system as described in FIGS. 3 and 6 could be distributed between modem 622A and phone 622B. In yet another embodiment, the entire functionality of an access system as described in FIGS. 3 and 6 could be included in phone 622B.

Figure 9:
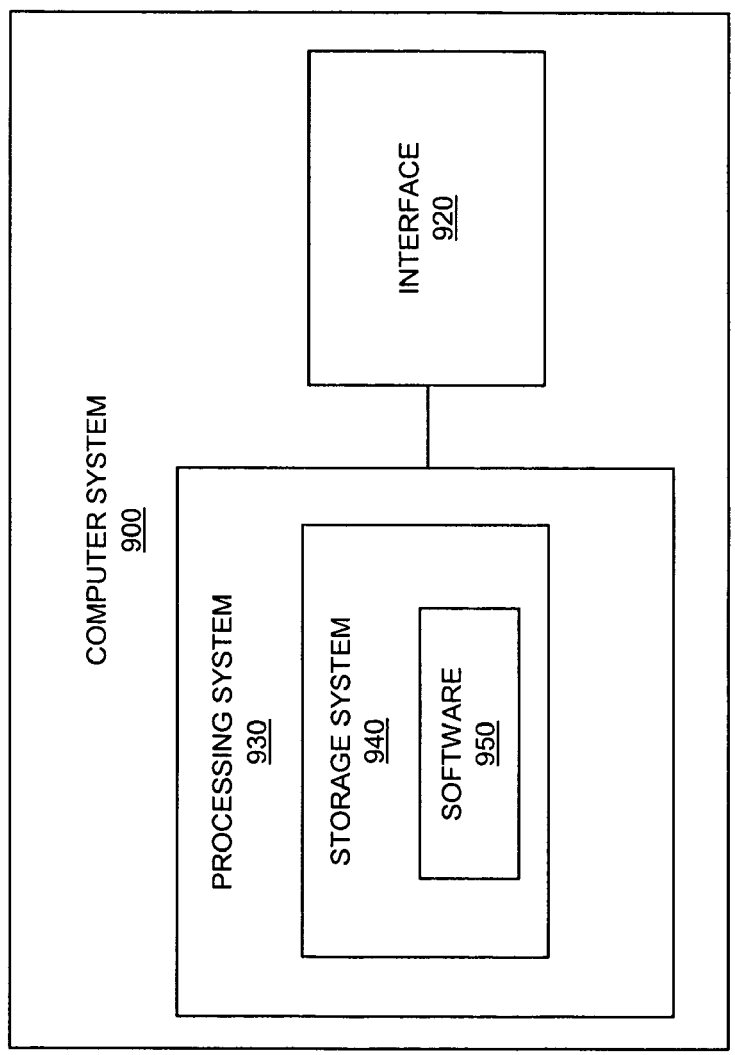
FIG. 9 illustrates a computer system in an embodiment of the invention.

FIG. 9 illustrates computer system 900 in an embodiment of the invention. Computer system 900 includes interface 920, processing system 930, storage system 940, and software 950. Storage system 940 stores software 950. Processing system 930 is linked to interface 920. Computer system 900 could be comprised of a programmed general-purpose computer, although those skilled in the art will appreciate that programmable or special purpose circuitry and equipment may be used. Computer system 900 may use a client server architecture where operations are distributed among a server system and client devices that together comprise elements 920-950.

Interface 920 could comprise a network interface card, modem, port, or some other communication device. Signaling interface 920 may be distributed among multiple communication devices. Interface 930 could comprise a computer microprocessor, logic circuit, or some other processing device. Processing system 930 may be distributed among multiple processing devices. Storage system 940 could comprise a disk, tape, integrated circuit, server, or some other memory device. Storage system 940 may be distributed among multiple memory devices.

Processing system 930 retrieves and executes software 950 from storage system 940. Software 950 may comprise an operating system, utilities, drivers, networking software, and other software typically loaded onto a general-purpose computer. Software 950 could also comprise an application program, firmware, or some other form of machine-readable processing instructions. When executed by the processing system 930, software 950 directs processing system 930 to operate as described for an access system as illustrated in FIGS. 3 and 6.

What is claimed is:

1. A communication network comprising:
   a service network configured to provide service sessions over access provided by an access network; and
   a first access system configured to establish a service session with the service network over the access provided by the access network, detect a loss of the access that causes a loss of the service session, receive an access restoration signal indicating that access has been restored from the access network, in response to receiving the access restoration signal, delay a first service session restoration for a first delay period, and initiate the first service session restoration after the first delay period.

2. The communication network of claim 1 further comprising a second access system configured to establish a second service session over the access provided by the access network, detect the loss of the access that causes a loss of the second service session, receive the access restoration signal indicating that access has been restored from the access network, in response to receiving the access restoration signal, delay a second service session restoration for a second delay period, and initiate the second service session restoration after the second delay period.

3. The communication network of claim 2 wherein the first delay period is different than the second delay period.

4. The communication network of claim 1 wherein the access network comprises a cable network.

5. The communication network of claim 4 wherein the access system comprises a cable modem.

6. The communication network of claim 5 wherein the access system comprises a phone coupled to the cable modem.

7. The communication network of claim 6 wherein the service session comprises Voice over Internet protocol (VoIP) service.

8. The communication network of claim 7 wherein the service network comprises a Voice over Internet protocol (VoIP) service network.

9. A method of operating a communication network, the method comprising:
   in a service network: providing service sessions over access provided by an access network; and
   in a first access system:
      establishing a service session with the service network over the access provided by the access network;
      detecting a loss of the access that causes a loss of the service session;
      receiving an access restoration signal indicating that access has been restored from the access network;
      in response to receiving the access restoration signal, delaying a first service session restoration for a first delay period; and
      initiating the first service session restoration after the first delay period.

10. The method of claim 9 further comprising in a second access system:
    establishing a second service session with the service network over the access provided by the access network;
    detecting the loss of the access that causes a loss of the second service session;
    receiving the access restoration signal indicating that access has been restored from the access network;
    in response to detecting the access restoration signal, delaying a second service session restoration for a second delay period; and
    initiating the second service session restoration after the second delay period.

11. The method of claim 10 wherein the first delay period is different than the second delay period.

12. The method of claim 9 wherein the access network comprises a cable network.

13. The method of claim 12 wherein the access system comprises a cable modem.

14. The method of claim 13 wherein the access system comprises a phone coupled to the cable modem.

15. The method of claim 14 wherein the service session comprises Voice over Internet protocol (VoIP) service.

16. The method of claim 15 wherein the service network comprises a Voice over Internet protocol (VoIP) service network.

17. An access system comprising:
    an interface configured to establish a service session with a service network over access provided by an access network; and
    a processing system configured to detect a loss of the access that causes a loss of the service session, receive an access restoration signal indicating that access has been restored from the access network, in response to receiving the access restoration signal, delay a service session restoration for a delay period, and initiate the service session restoration after the delay period.

18. The access system of claim 17 wherein the processing system is configured to randomly generate the delay period.

19. The access system of claim 18 wherein the service session comprises Voice over Internet protocol (VoIP) service.

20. The access system of claim 19 wherein the service network comprises a Voice over Internet protocol (VoIP) service network.

* * * * *